US008762382B2

(12) United States Patent  
Harrison et al.

(10) Patent No.: US 8,762,382 B2
(45) Date of Patent: Jun. 24, 2014

(54) METHOD AND SYSTEM FOR CLASSIFYING TEXT

(75) Inventors: Paul Harrison, Keller, TX (US); James Oliphant, Pleasnt Grove, UT (US); Hal Fulton, Austin, TX (US); Armin Roehrl, Koetzting (DE); Brenden Grace, Charlottesville, VA (US)

(73) Assignee: Collective, Inc., New York, NY (US)

( * ) Notice: Subject to any disclaimer, the term of this patent is extended or adjusted under 35 U.S.C. 154(b) by 749 days.

(21) Appl. No.: 12/462,908

(22) Filed: Aug. 11, 2009

(65) Prior Publication Data

US 2010/0094875 A1 Apr. 15, 2010

Related U.S. Application Data

(60) Provisional application No. 61/188,566, filed on Aug. 11, 2008.

(51) Int. Cl.
G06F 17/30 (2006.01)

(52) U.S. Cl.
CPC ...... *G06F 17/3071* (2013.01); *G06F 17/30734* (2013.01)
USPC .......................................... 707/741

(58) Field of Classification Search
None
See application file for complete search history.

(56) References Cited

U.S. PATENT DOCUMENTS

| | | | |
|---|---|---|---|
| 5,251,131 A | 10/1993 | Masand et al. | |
| 5,727,199 A | 3/1998 | Chen et al. | |
| 6,026,399 A | 2/2000 | Kohavi et al. | |
| 6,044,375 A | 3/2000 | Shmueli et al. | |
| 6,134,532 A * | 10/2000 | Lazarus et al. | 705/14.25 |
| 6,523,026 B1 | 2/2003 | Gillis | |
| 7,194,471 B1 | 3/2007 | Nagatsuka et al. | |
| 7,716,216 B1 * | 5/2010 | Harik et al. | 707/724 |
| 2003/0023488 A1 | 1/2003 | Landsman et al. | |
| 2003/0182304 A1 | 9/2003 | Summerlin et al. | |
| 2004/0034633 A1 | 2/2004 | Rickard | |
| 2004/0088157 A1 | 5/2004 | Lach et al. | |
| 2004/0215509 A1 | 10/2004 | Perry | |
| 2004/0215515 A1 | 10/2004 | Perry | |

(Continued)

FOREIGN PATENT DOCUMENTS

GB 2345771 7/2000

OTHER PUBLICATIONS

International Search Report of the International Searching Authority dated Sep. 24, 2009 for International Application No. PCT/US09/04580, filed Aug. 11, 2009; 4 pages.

(Continued)

*Primary Examiner* — Dinku Gebresenbet
(74) *Attorney, Agent, or Firm* — Morgan, Lewis & Bockius LLP

(57) ABSTRACT

A content classification system, method and computer product is presented. In connection with the invention, a data structure is created by identifying a plurality of words and mapping each word to one or more categories. The data structure is indexed. An item of content is identified and classified based on the data structure. The classification includes identifying all one—or more—word combinations in the item of content; for each word of at least a pre-determined number of characters in length in each of the word combinations, identifying each of the categories to which it is mapped; and determining a weight for each of the words based on an inverse proportion to the number of categories to which it is mapped.

33 Claims, 5 Drawing Sheets

(56) References Cited

U.S. PATENT DOCUMENTS

| | | | |
|---|---|---|---|
| 2004/0254911 A1 | 12/2004 | Grasso et al. | |
| 2005/0154781 A1 | 7/2005 | Carlson et al. | |
| 2005/0251384 A1* | 11/2005 | Yang | 704/10 |
| 2006/0080293 A1 | 4/2006 | Nahum | |
| 2007/0022085 A1* | 1/2007 | Kulkarni | 707/1 |
| 2007/0073678 A1 | 3/2007 | Scott et al. | |
| 2007/0143296 A1 | 6/2007 | Casion | |
| 2007/0300152 A1 | 12/2007 | Baugher | |
| 2008/0059486 A1* | 3/2008 | Pappas | 707/100 |
| 2008/0104032 A1 | 5/2008 | Sarkar | |
| 2008/0275753 A1 | 11/2008 | Protheroe et al. | |
| 2008/0275777 A1 | 11/2008 | Protheroe et al. | |
| 2009/0006363 A1 | 1/2009 | Canny et al. | |
| 2009/0089277 A1 | 4/2009 | Cheslow | |
| 2009/0150375 A1* | 6/2009 | Mityagin et al. | 707/5 |

OTHER PUBLICATIONS

PCT International Preliminary Report on Patentability, PCT/US2010/022176, dated Aug. 11, 2011 (2 pages) attaching PCT Written Opinion of the International Searching Authority, dated Mar. 12, 2010 (3 pages).

PCT International Preliminary Report on Patenability, PCT/US2009/063994, dated May 26, 2011 (2 pages) attaching PCT Written Opinion of the International Searching Authority, dated Jan. 12, 2009 (4 pages).

Thomas, Paul, Generalising Multiple Capture-Recapture to Non-Uniform Sample Sizes, Jul. 20-24, 2008 SIGIR'08, (2 pages).

PCT International Preiminary Report on Patentability, PCT/US2010/041353, dated Jan. 19, 2012 (5 pages) attaching PCT International Search Report and Written Opinion of the International Searching Authority dated Sep. 1, 2010 (7 pages).

Chavez-Demoulin, V.C., et al.; The WEB archives: A time-machine in your pocket!; Feb. 14, 2000, www.approximity.com/papers/archive13 (16 pages).

Cilibrasi, Rudi L., et al.; The Google Similarity Distance; IEEE Transactions on Knowledge and Data Engineering, Mar. 2007, vol. 19, No. 3, pp. 370-383 (15 pages).

Domingos, Pedro, et al.; On the Optimality of the Simple Bayesian Classifier under Zero-One Loss; Machine Learning, vol. 29, pp. 103-130 (1997) (28 pages).

Gupta, Aarti, et al.; Using Ontologies and the Web to Learn Lexical Semantics, IJ CAI, 2007, pp. 1618-1623 (6 pages).

Kotisiantis, S.B., et al.; Logitboost of Simple Bayesian Classifier; Informatica, 2005 vol. 29, pp. 53-59, (7 pages).

Zhang, Harry; The Optimality of Naive Bayes; 2004, American Association for Artificial Intelligence (www.aaai.org) (6 pages).

Wong, Wilson, et al.; Tree-Traversing Ant Algorithm for term clustering based on featureless similarities; (2007) Data Min. Knowl. Disc., vol. 15, pp. 349-381 (33 pages).

Rish, I; An empirical study of the naive Bayes classifier, IJCAI 2001 Workshop of Empircal Methods in Artificial Intelligence (6 pages).

Minsky, Marvin; Steps Toward Artificial Intelligence; Dept. of Mathematics, MIT, Research Lab. of Electronics, MIT received Oct. 24, 1960 (72 pages).

McCallum, Andrew, et al.; A Comparison of Event Models for Naive Bayes Test Classification, AAAI/ICML-98 Workshop on Learning for Text Classification; AAAI Press—1998—vols. Technical Report WS-98-05, pp. 41-48 (8 pages).

European Search Report issued on Nov. 5, 2012 in counterpart European Application No. 09806949.5.

* cited by examiner

METHOD AND SYSTEM FOR CLASSIFYING TEXT

This application claims the benefit of the U.S. Provisional Patent Application No. 61/188,566 filed on Aug. 11, 2008, which is hereby incorporated by reference.

FIELD OF THE INVENTION

The present invention relates to classifying text identified in a given source.

SUMMARY OF THE INVENTION

The present invention is directed to a system, method and computer product for classifying content. In connection with the invention, a data structure is created by identifying a plurality of words and mapping each word to one or more categories. The data structure is indexed. An item of content is identified and classified based on the data structure. The classification includes identifying all one—or more—word combinations in the item of content; for each word of at least a pre-determined number of characters in length in each of the word combinations, identifying each of the categories to which it is mapped; and determining a weight for each of the words based on an inverse proportion to the number of categories to which it is mapped.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE INVENTION

Reference will now be made in detail to the embodiments of the present invention, examples of which are illustrated in the accompanying drawings. Wherever possible, like reference numbers will be used for like elements.

Figure 1:
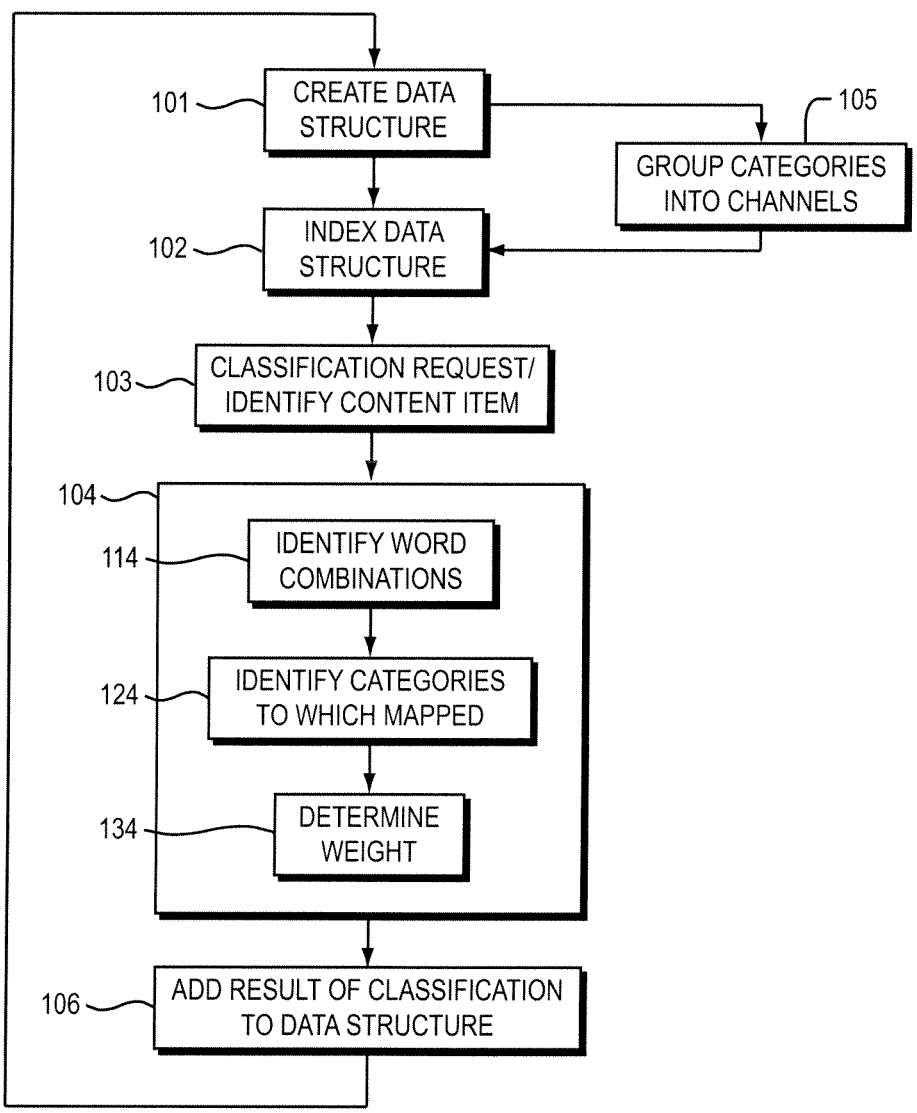
FIG. 1 is a flow diagram illustrating an exemplary method of the present invention.

With reference to FIG. 1, an exemplary method of the present invention is described. Additional details regarding the method, and the system used to carry out the method, are described elsewhere herein. In step 101, a data structure is created by identifying a plurality of words and mapping each word to one or more categories. In step 105, one or more of the categories are grouped in to one or more channels. In step 102, the data structure is indexed. In step 103, an item of content is identified and a request to classify the request is received. If the content item is text, it is classified as described with reference to step 104. If the content item is a URL, an HTTP request must first be made to obtain the content associated with the URL (or, alternatively, classification is performed on the URL itself, without reference to the content on the page to which the URL points). The content is classified, in step 104, based on the data structure. The classifying step includes identifying all one—or more—word combinations in the item of content, in step 114. For each word of at least a pre-determined number of characters in length in each of the word combinations, each of the categories to which it is mapped is identified, in step 124. A weight for each of the words is determined based on an inverse proportion to the number of categories to which it is mapped, in step 134. In some embodiments, a value is assigned to the weight based on a relative relatedness between words using a semantic distance measure, in step 135. In step 106, the result of classifying the content is added to the data structure.

Figure 2:
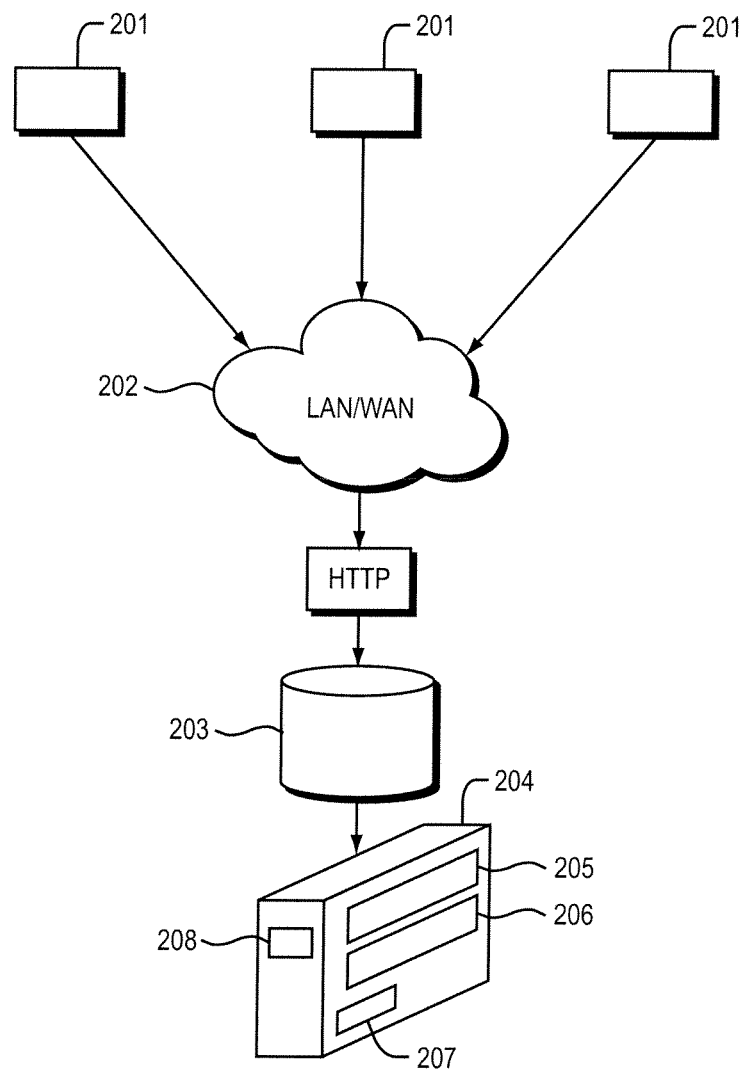
FIG. 2 is a diagram illustrating system components and how such components interact in accordance with the present invention.
Figure 3:
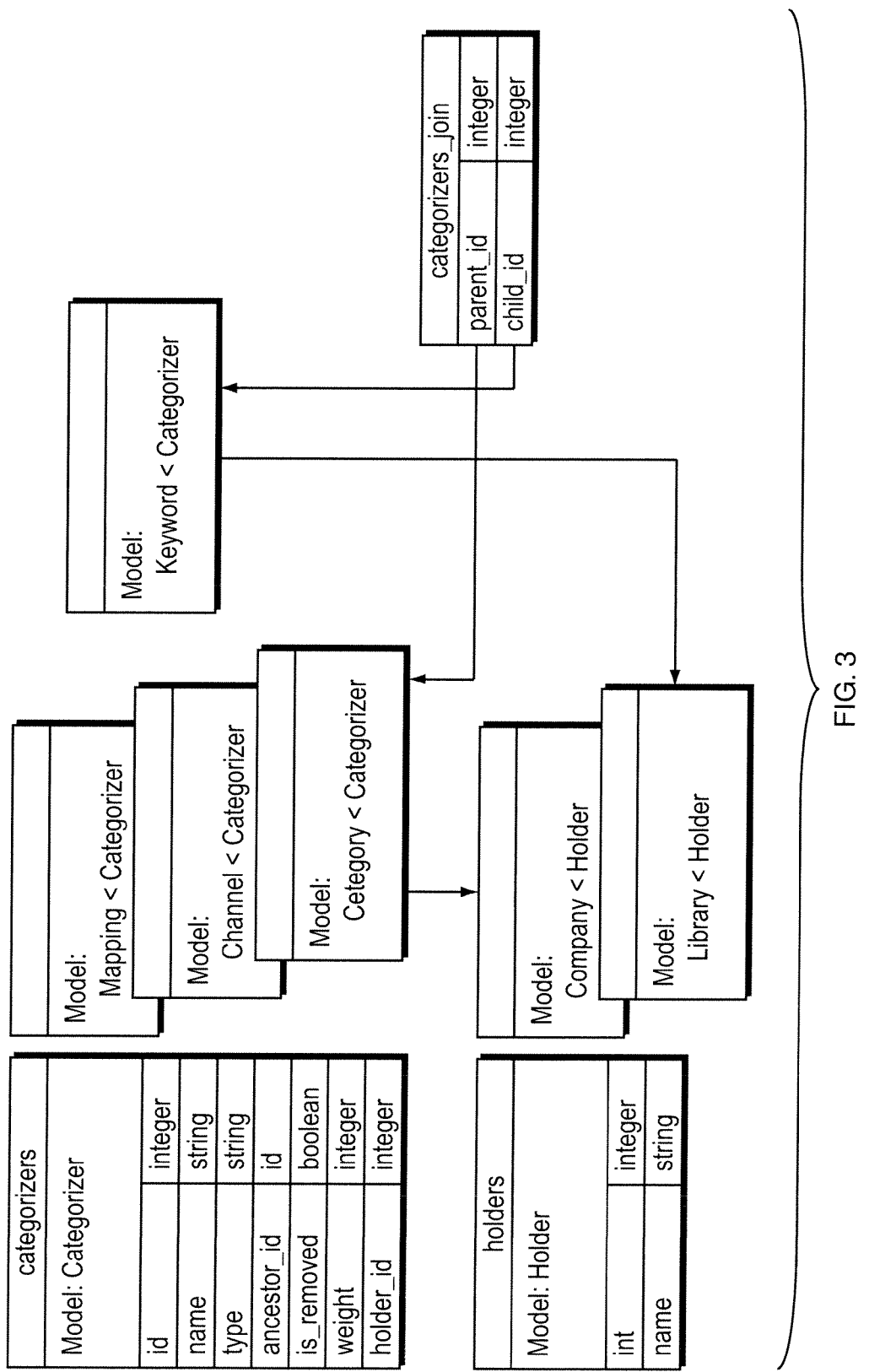
FIG. 3 is a schema of an exemplary mapping model.
Figure 4:
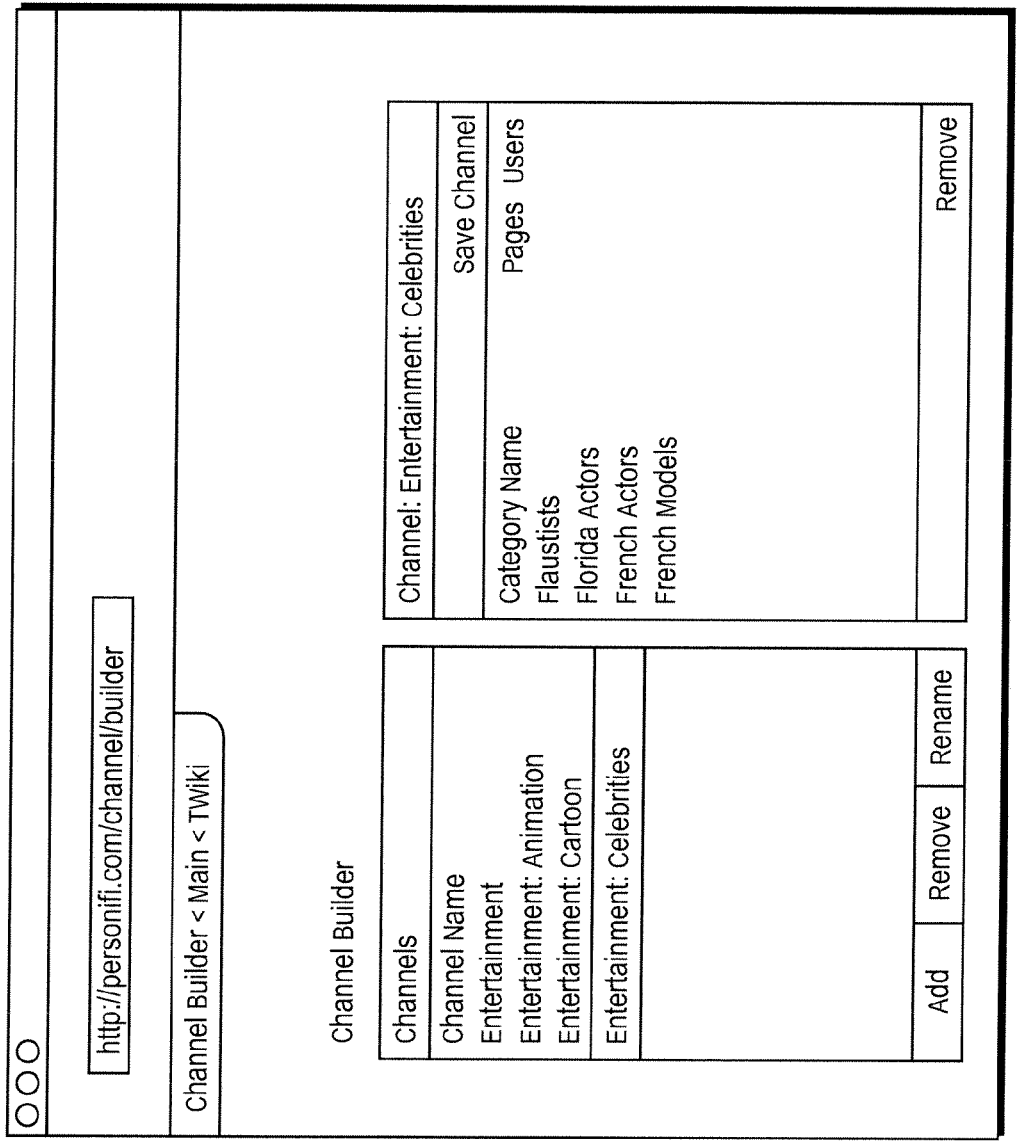
FIG. 4 is an exemplary user interface of the channel builder in accordance with one embodiment of the present invention.
Figure 5:
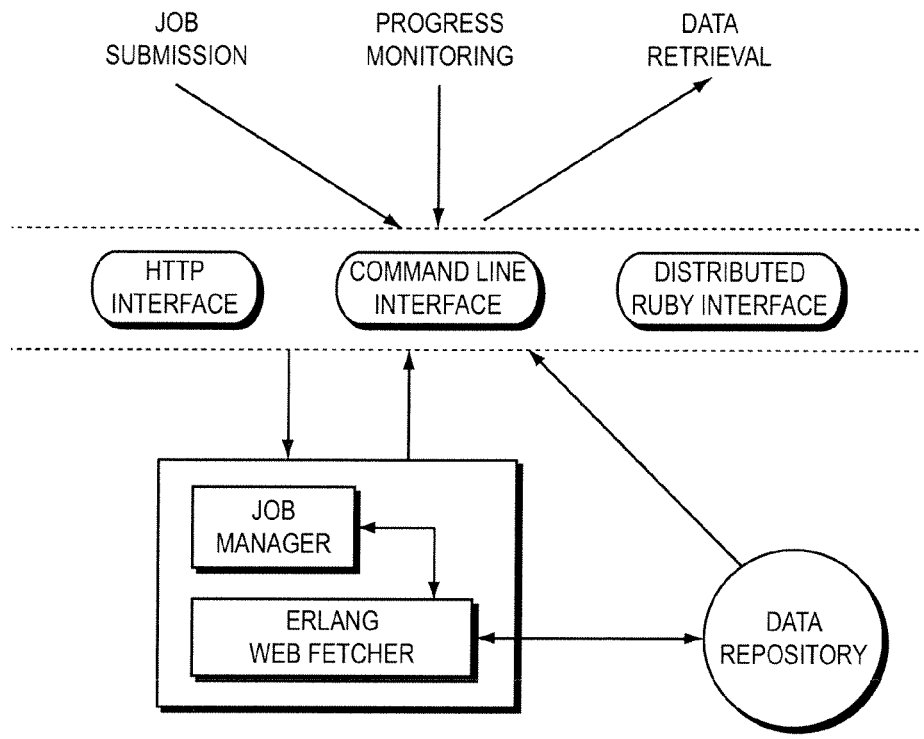
FIGS. 5 and 6 are diagrams illustrating the methods employed by two crawlers in accordance with one embodiment of the present invention.
Figure 6:
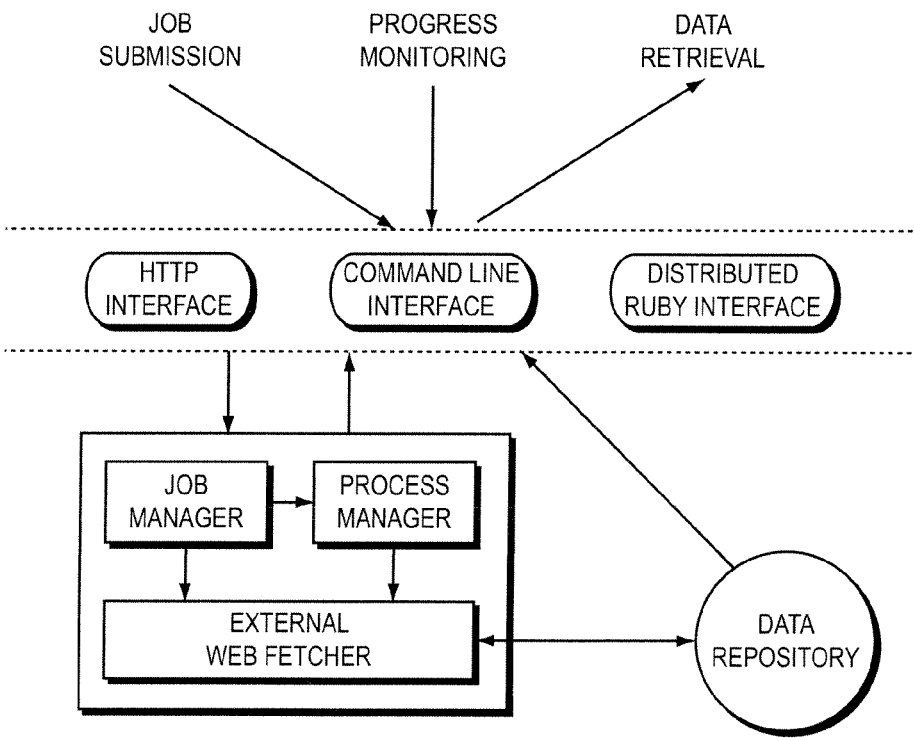

With reference to FIG. 2, an exemplary system for carrying out the present invention is shown. Data sources 201 comprise servers that maintain content accessible over a local area network or, preferably, a wide area network such as the Internet 202. Communication with such data sources 201 is achieved in one embodiment using HTTP. Exemplary data sources 201, as described elsewhere herein, may include BBC, Wikipedia and DMOZ, although other data sources can be used within the scope of the present invention. Data obtained from such data sources 201 is maintained in one or more databases 203, which, in one embodiment, comprises a 500 GB hard drive with at least 32 GB of RAM. Database 203 may be stored on or in communication with one or more servers 204. Server(s) 204 includes memory for storing executable software code to perform the methods of the present invention. A processor on the one or more servers 102a and 102b may execute the software code to perform the methods of the present invention. The memory may include RAM or a hard drive or other types of memory that are known to one of ordinary skill in the art. In one embodiment, at least 4 GB of RAM is required to store the data structure created. Server 204 may include a data structure generation engine 205 (e.g., a processor) specially programmed to identify words from the data sources and map each word to one or more categories, and perform the other functions as described more detail herein with regard to the creation of the data structure. Server 204 may also include an index generation engine 206 (e.g., a processor) specially programmed to index the data structure, as described in more detail herein. Additionally, server 204 may include a channel builder 207 (e.g., a processor) specially programmed to group categories into channels as described in more detail herein. An exemplary schema for a mapping model is shown in FIG. 3 and an exemplary interface for channel builder 207 is shown in FIG. 4. Thus, server 204 includes processors that are specially programmed to perform statistical difference metric and cluster analysis on the data obtained from data sources 201, and map keywords to categories, as described in more detail herein. Server 204 may also maintain classification engine 208 (e.g., a processor) specially programmed to perform classification in accordance with the embodiments described in detail herein. Content to be classified may be obtained using crawling engines, such as those described with reference to FIGS. 5 and 6.

An overview of some of specific features supported by certain embodiments of the present invention is now provided. Content is classified in many, e.g., hundreds of thousands, of low-level categories. Bigger semantic concepts are grouped through creation of a mapped layer with a channel builder tool. An index is built using data sources, including data sources that are human-concept driven, such as, for example, Wikipedia, ODP, and Knoll, which allows for the classification to be more natural and easy to understand. A distance measure is defined, referred to herein as ESD, and can be used in connection with building the index. The data basis is an extremely large corpus of input data, which is discovered automatically using advanced online crawling methodologies. The classification technique used in connection with the present invention supports multi-lingual classification, without need for translation of the content being classified. Support tools may be provided for the fuzzy discovering of related content, as can be used in online advertising or error detection. Each of these technologies, and the manner in which they interact, is described in more detail herein.

In general, classification refers to understanding what a text snippet (a word, a sentence, a paragraph, or an entire document, from a web page, or a portion thereof, from a document, from plain text, etc is about on a detail level and/or a main conceptual level. Enhanced Semantic Distance (ESD) as used herein, refers to the converged distribution of concepts; it is a distance measure that shows the relative relatedness between words, categories, or documents. The channel builder tool, as described herein, is used to develop higher level channels from lower-level categories. For example, many low-level categories may be grouped into one channel.

Both speed and quality are considered in connection with the described classification methods. A weighted word count for words on different topics, which is extremely fast and straight-forward to implement, leads to excellent results, provided one knows all relevant words in all topics and how to weigh them. If enough data is available, complex statistical models are not needed, as the data has converged and a steady/converged distribution can be relied upon to deliver desired results.

A topic, as referred to herein, means what is generally referred to as a category or a semantic concept. "Soccer", for example, is a concept within a hierarchy of concepts with a root of "Sports". Hierarchies can overlap or be ordered in tree-structures. Words can belong to several topics and the final decision as to the meaning of particular word in a particular context is determined at the end of the analysis (i.e., disambiguation).

Statistical techniques are used to generate high quality data structures, which are used as a basis of the classification methods described herein. The first form of data is the discrete structure referred to as a keyword. This is the atomic structure of the exemplary classification system described herein. The second form of data is an association, or grouping, of keywords. The most atomic grouping of keywords is the category. In the exemplary embodiment described herein, the category has no technical difference than any other grouping in the system, but generally is a more universal and less specialized grouping of keywords. A second form of grouping used in the exemplary embodiment of the system described herein is the structure known as a channel. Each channel is composed of multiple categories. The definition of the channels used in the system may be industry-driven and tailored for a given end user of the system.

By way of example of the manner in which keywords are associated with categories, the number of associations between 2.2M Keywords and 200K Categories is approximately 5M. In connection with an implemented embodiment of the present invention, such numbers rise 10% per month. This demonstrates that the system continuously grows and picks up new concepts as they appear in any statistically significant frequency within the body of text that serves as the basis of the classification system (e.g., pages on the World Wide Web). It also demonstrates that the growth is stable and contained within an expected range of growth that matches conceptual information growth, thereby verifying the high-quality nature of the classification system output.

With regard to implementation of data structures, in connection with low-level classification generation, the following hash-tables can be used:

num2category: Mapping from numbers to human understandable categories;
  example: 1=>"Soccer", 2=>"Bird watching", 3=>"Germany", 4=>"USA", etc.

keyword2category: Mapping from keywords to categories (i.e., the identity of categories to which a word belongs).

By way of example, the word "computer" scores in
30604: Computer_hardware

The word "computer" belongs to only one category ("Computer hardware"). The internal identifier of that category is 30640.

The word "tax" belongs to many categories:
14184, Basic_financial_concepts
120679, Tax_reform
120682, Taxation
120698, Taxation_in_the_United_States The word "Paris" belongs to many categories:
23109: Capitals_in_Europe
26882: Cities,_towns_and_villages_in_France
27234: Cities_in_France
35635: Departments_of_France
59003: Host_cities_of_the_Summer_Olympic_Games
90043: Orthodox_Jewish_communities
91142: Paris
134772: World_Heritage_Sites_in_France In connection with the embodiment described herein, the classification method involves consideration of all consecutive 1-word, 2-word and 3-word combinations of the given input text. In other embodiments, this method can be made more complex by making ever longer windows to capture idioms and longer slang expressions. For every word of at least three characters in length, the categories in which it scores are determined. The number of times each category has appeared is determined, and a result is returned identifying the order in which such categories are presented. The system then determines all possibilities in parallel and makes a final decision at the end through a disambiguation process. A weighted vector of categories is then returned in connection with the method.

Thus, the first weighting assigned to a keyword is the reciprocal of the number of categories in which it appears. The rarer keywords are thereby given more weight, and the more common keywords are given less.

In some embodiments, a refinement can be made, pursuant to which longer phrases are weighted with higher weights (i.e., because longer phrases are presumptively more meaningful and more specific). Thus, by way of example, "golden gate bridge" as a single phrase will receive a higher weight than any of its individual words. A multiplier (e.g., 1.5) may be used to bring out this effect (e.g., so that single-word phrases weigh as 1, double words as 3, triple words as 4.5 etc.).

In other embodiments, an additional refinement can be made. In connection with these embodiments, the keywords are treated not as isolated data, but in the context of the categories or channels to which they are assigned. A keyword-channel tuple can be given an arbitrary weight (i.e., either according to human judgment or an algorithmic assignment). In the described embodiment, the default weight is 10 (to allow for small non-zero weights such as 3 or 5 without involving floating-point arithmetic). Weights may be arbitrarily large and may be negative. A negative weight penalizes that choice of keyword-channel.

Keyword ESD provides a way to assign default values to these weights. For example, the mean ESD of a keyword and its neighbor keywords in each channel/category can be found. For example, if a channel/category C has four keywords {k1, k2,k3,k4}, then ESD(k1,C) is calculated as being (ESD(k1, k2)+ESD(k1,k3)+ESD(k1,k4)/3 (a simple arithmetic mean). Because ESD is a true distance, its values are essentially inverse to weights. One solution is to identify a constant, such as 10, and divide by the ESD, as in the following:

weight=10/ESD($k1,C$) (where the result may be truncated to avoid further floating-point calculations)

With regard to mapped classification, channels can be defined as arrays of low-level categories and used as classification. For example, a channel "automotive" can be defined as out of the following sub-categories:
"auto"==>AMC_engines, AMC_vehicles, ARO_vehicles, Acura_vehicles, Alfa_Romeo_engines, Alfa_Romeo_vehicles, All_wheel_drive_vehicles, Aston_Martin_vehicles, Audi_vehicles, Austin-Healey_vehicles, Austin_vehicles, Auto_parts, Auto_racing, Auto_racing_organizations, Automatic_transmission_ tradenames, Automobile_awards, Automobile_engines, Automobile_history_eras, Automobile_layouts, Automobile_platforms, Automobiles, Automotive_accessories, Automotive_chemicals, Automotive_companies_of_Italy, Automotive_industry, Automotive_safety_technologies, Automotive_steering_technologies, Automotive_suspension_technologies, Automotive_technologies, Automotive_transmission_technologies, Autozam_vehicles, BMC_engines, BMC_vehicles, BMW_engines, BMW_motorcycles, BMW_platforms, BMW_vehicles, . . . .

By way further example, "basketball" is defined as follows: "basketb"==>ACB_league, ACB_league_managers, ACB_league_players, ACC_Men's_Basketball_Tournament_Venues, AEK_Athens_basketball_players, AEL_Limassol, AEL_Limassol_players, . . . .

All the keywords can be extracted from the underlying categories and new categories can be made that consist of the keywords in the underlying categories. Data structures consisting of the channel names as categories and the keywords appearing in the categories used in the mapping are generated. The weights of each keyword can be set to 1, or can be more sophisticated by adding the weights of all low-level categories that use that keyword and appear in that one channel. This method provides several advantages, including that it does not require the intermediate stage of counting the number of low-level categories in which the keywords scored and to which channels they belong. It allows involves lean data structures, thereby resulting in memory savings and higher speed.

The following provides an example of a classification result (categories only) in XML-format. This exemplary web page has been classified as healthcare (40%) and science (30%).
<?xml version="1.0"?>
<pfi>
<mapped>
<category>
<name>healthcare</name>
<score>0.4<score>
</category>
<category>
<name>science</name>
<score>0.3</score>
</category>
</mapped>
</pfi>

In any classification system, a tremendous amount of data must be available. In the exemplary system embodiment described herein, this data exists in two forms: channel categories keywords and channel keywords. In the following example of channel categories keywords, the channel "Pets" maps to a set of categories, each of which maps to a list of keywords:
Pets Dogs, dogs, dog food, cocker spaniel, doberman, . . . .
Cats cats, cat food, litterbox, feline, . . . .
Fish fish, goldfish, betta, aquarium, . . . .

As described previously, a keyword2var data structure can be generated for the mapped results. This method results in a savings in time, memory, and complexity given that the intermediate stage is essentially bypassed, and the keywords are associated directly with a channel.

The following is an example of channel keywords:
Pets dogs, dog food, cocker spaniel,
doberman, cats, cat food, litterbox,
feline, fish, goldfish, betta, aquarium, . . . .

End users can add and delete channels and keywords, in effect, creating their own individualized ad hoc mapping. This can be done at both the channel level and the category level.

A major constraint of many channel building systems is not only storing and using the massive amount of data found in discrete structures like the keywords, but also in the large number of associations linking all of these structures. The problems become amplified when a system needs to support many groupings of channels, with many custom modifications of these associations. To perform classification properly, all data for a given mapping, or grouping of channels, must be available at the time classification is occurring. To produce this massive amount of custom data for each customer, the system must efficiently and effectively replicate and reuse data. The following describes the manner in which this is achieved in the exemplary system described herein.

In particular, to meet such demands, the exemplary channel building tool described herein uses two techniques. The first technique described herein involves reuse, replication and differentiation of data. In particular, it would be very difficult to copy the massive amounts of data needed for custom classification for each customer or mapping. The classification system handles this by reusing keywords, categories, and channels. Because most customizations are small, replication of entire trees of data would be unnecessarily costly. The below described functions allow the system to tie seamlessly efficient data storage with unlimited customization and control. The second technique is referred to as ancestry. Ancestry refers to the linking of objects to minimize the need for replication. When a new mapping is created for a customer, a single mapping object is created and is linked to a preexisting "library" mapping through its ancestor field. The ancestry association tells the system that, when retrieving children for the mapping, or channels, both the ancestor and the mapping object should be queried and merged (merging rules are embedded in the objects, as described below with regard to embedded differentiation rules). While this may result in a slower time of channel association recovery due to the multiple paths, other advantages (described herein with regard to caching) are presented.

The exemplary system described herein may also involve embedded differentiation rules. In particular, in order to merge efficiently two sets of data, rules are embedded in the objects. This allows for quick, efficient merging without the expense of costly lookups. The exemplary system described herein also makes use of differentiation through branch linking. In particular, to allow for efficient modifications, the channel building system does not replicate entire branches, only the link to the trunk. As referred to herein, the trunk of classification data is the mapping object, and branches are the associations linking a mapping to a channel and then to a category. If a customization of a mapping requires the renaming of a category, the entire set of associations under the parent channel need not be recreated. Instead, a copy object, using the ancestry linking described above, is made for each node in the branch, linking the customized category to the trunk.

As noted, the efficiency of storage from ancestry increases the number of queries in the system and adds the need for branch merging. However, the static quality of the ancestry branches lends itself to very efficient caching. Because most branches in a mapping are from ancestors, and because those objects are not similar, but the exact same across many mappings, the step of finding the association of children to an ancestor is a single fast retrieval from a memory cache. This means, for example, that if only 2% of a mapping has diverged, database access will be limited to that 2%, while the other 98% will come straight from a fast memory cache layer. Thus, the complexity of ancestry actually results in faster retrieval times when caching is used.

FIG. 3 is a schema of an exemplary mapping model.

FIG. 4 is a screen shot of interface for an exemplary channeling building tool. This interface can be used by an end user of the system to create custom channels.

Index generation is the process that involves creating the data structures needed to implement text classification in accordance with a preferred embodiment of the present invention. In one embodiment, a source generated by a human is used as a foundation for the base taxonomy. Some exemplary sources include Wikipedia, Knoll, ODP, WikiNews, and other news sites such as BBC and Google News. Various sources may be aggregated in order to maximize the reach of human concepts and access deeper content.

The following is an illustrative example of how to collect human-driven concepts from Wikipedia. Wikipedia allows for the download of content from download.wikipedia.org. The downloaded content is then imported in a relational database and, for each content item (e.g., each article), the title, the content and the categories to which such content item belongs are extracted. Using the extracted data, all page titles of a category are taken as the keywords for that category. For sources such as Wikinews, the categories and a word frequency count can be used instead of the page titles, as the page titles are typically too long. Other sources can be added to provide a more robust data structure. For example, news sources, such as nytimes.com, and their inherent human-driven structure provides new training data on a regular (e.g., daily) basis.

The data structures resulting from such information sources may require refinement. For example, some categories add little or no value to the data structure. Such categories (e.g., that appear more than a few thousand times) can be deleted.

When dealing with Wikipedia, by way of example, a hierarchical tree structure may result, including categories in child/parent relationships. This allows for walking up and down the tree to zoom in and out of categories, e.g., the tree can be walked from "soccer" to "sports" (up the tree—less detail) or to "soccer in the UK" (down the tree—more detail). In some circumstances, nodes are found that are too broad and connect things that humans would not see as connected. Using ESD, these instances can be eliminated by stopping any tree-walk as soon as the ESD-difference between two categories is bigger than a given threshold (e.g., 0.3 as a threshold).

The input basis to the data structure can be expanded by taking into account external links in pages and to treating them as outlined below (with reference to the DMOZ example) combined with the method described above with regard to Wikipedia.

DMOZ (http://www.dmoz.org) is one example of a large link directory that includes sections and links to external pages. In this example, each link is downloaded, including the content of the pages to which the links point. Instead of using the page-titles, as described above in the Wikipedia example, each section is used as a category and the keywords that appear in the pages accessed via the links most frequently are taken.

Once the core-data structure is created, it may be fine-tuned and maintained by methods that include statistical cleaning, the feedback-loop described herein, as well as human efforts such as allowing end users to add/remove words to categories, allowing end users to remove categories, and allowing end users to add categories. These refinements can be maintained in a database (e.g., a Postgres database). Alternatively, human-editable YAML files and saved cached versions can be used to avoid the waiting time at each loading.

In one embodiment, a new index is completed about once every several months, automatically incorporating all human—and statistically—learned changes in the new index.

In some embodiments, the index can be generated without a data structure being created, using ESD. In particular, ESD can be used to perform a cluster analysis on words. A large corpus of documents is reviewed, as it is obtained, for example, from the classification effort described above in an alternate embodiment. A word-count is performed and a certain percentage (e.g., 80%) of the most popular words are taken, minus a certain percentage (e.g., 5%) of the most common words, eliminating stop-words like "he", "she", and "is" by way of example. This defines the keywords that are monitored and with which an ESD-index can be generated. Once the ESD-index is generated, a clustering algorithm, for example, can be used to rebuild categories from these words. Thus, the words that are close to each other in meaning are collected together in one category, allowing for overlap.

Categories can be generated without overlap according to the following process:

keywords←all keywords that are important
    while no keywords left or no longer enough words to form
       new categories
    current_word=one random_word(keywords)
    New category=(All keywords where ESD(current_word,
       word)<threshold)
    The words in the new category are now removed from
       keywords.
end The same approach can be taken to generate categories with overlap. Standard techniques like pruning/trimming can be performed as well.

With regard to creating meaningful names for these new categories, this can be accomplished, for example, either by looking at the output of some sample sets and manually assigning tags, or taking the word that is in the center (e.g., the most striking word is the one that is closest in distance to most other words in that category) of the category as name. ESD can then be used to refine the categories obtained from analyzing the structure like Wikipedia or DMOZ, over ESD, but the ESD-index has since improved in connection with the feedback loop described herein. In some instances, due to noise or topics that do not have enough documents identified for them as of yet, words appear that, for humans, make no sense. Removing all words that are further away than a threshold from the center of the category shows very good results. As discussed previously, words that are close to the center, but not yet in the index, should be added to the index. One example is new words that a customer has added but have not yet been placed in the correct position relative to the threshold. This also occurs when many new documents about specific topics are crawled; more is learned about these topics and they can be added to a category/mapping. Adding words is done non-exclusively, i.e., the same word might be added to two categories that are not very close, as it might have different meanings based on the content.

ESD has other applications, including the following. It may be used for matching of pages and advertisements. In particular, advertisers are often faced with the problem that they have to decide which ads to display on what web pages. Traditionally, they have many thousands of different pages, but only a few hundred different ads. Using ESD, a fuzzy-match can be performed and, despite not having the perfect match, the best possible match, up to a threshold (e.g., 75%), can be detected. Also, ESD can be used to detect outliers/bugs in a mapping. For example, by looking at categories or keywords that are far from the center, a potential source of errors is detected. It can also be used to make recommendations. Users can be saved time finding pages with topics of interest by entering one or several keywords, and thousands of similar ones are returned. ESD can also be used for probabilities, in that it can be used to reduce the number of categories, which can be helpful, e.g., for ads-page classification matching. With ESD alone, a decision tree for classification can be used.

The system described herein allow for at least two access methods to the API: instant real time results on a page-by-page basis, via Javascript (JSON) or a dedicated http-call to server(s); or as a batch process, pursuant to which users submit pages and/or advertisements, that are then classified (and possibly matched up with their ads) and the results are returned in single pass. Thus, many URLs are downloaded which, in return, are fed into the classification index and ESD so that, over time, the algorithms are automatically trained on exactly the kind of data that the customers are viewing (i.e., referred to herein as the feedback loop).

For the first access method, the full URL of the page is obtained. If the Javascript is run in an iframe, by way of example, the DOM-tree in the browser is walked up as far as possible. Using Javascript/JSON, it can be seen on the fly how a page is classified and this can be passed as a key-value pair to the ad-server in charge, so that the right ads can be served at the time.

At least two types of content (e.g., advertising content, by way of example) can be classified in accordance with the systems and methods described herein: text based content, which is classified by combining the page-content behind the content to be classified and the text of the content to be classified; and graphical content, which is crawled and the resulting page behind the content is classified.

Classification has many uses, including the following. Fuzzy and non-fuzzy matching of ads and pages can be accomplished either with ESD or by walking up the hierarchy to the parent of a classification. Walking up the hierarchy (rolling up detail) is like zooming out so that the larger picture is revealed. Classification can also be used for knowledge management (e.g., finding similar content); understanding content and intelligence gathering (e.g., federated media trying to understand about what topics it has blogs); and recommendation of similar content. Classification can be used to personalize content, as well as in connection with contextual and behavioral (i.e., context over time) online advertisements. It can also be used in connection with content and spam filtering.

The crawlers used in connection with the present invention are now described. In an exemplary embodiment, a large number of pages is crawled for classification purposes—sometimes entire domains. Images and binaries are ignored in the preferred embodiment. These are pages on which customers want to display ads or to better understand their inventory, e.g. blogs that get positioned to online advertisers. Crawlers may be used for classifying pages and then caching the requests (high-performance, memcache); as input to match online ads with URLs or domains; and either in real-time or as batch.

One embodiment of the present invention makes use of a crawler and caching (retrieval) at the same time. One exemplary interface that can be used in connection with this embodiment is a webserver on an intranet (i.e., a caching proxy server). In this embodiment, one large cache is available for all needs, and intranet access is very fast. The parameters for such a service include:

domain or URL
  max time
  random wait between hits (avoid banning)
  max # of pages to download
  max # bytes to download
  max wait-time per page
  max wait-time per domain
  depth
  min page size
  max page size
  language: english, spanish, all, etc.

The crawler makes use of multiple machines and multiple processes as needed. A switch (i.e., strict/lenient) is used when deciding whether a link is on the same domain (e.g., whether abc.foo.com should be considered part of foo.com). Optionally, the HTML may be stripped out, or it may be kept. Pictures and binaries, by way of example, are filtered out (although file names may be left in for the classifier). The robots.txt files are honored when they are found. Cookies are stored and updated to deal with pages that need a user-login (i.e., the crawler essentially behaves like a user, logins in and sets the corresponding cookies). Parameters and information are recorded for each domain, by way of example: when crawled last; to what depth; bytes returned; pages stored; pages discarded (too small, binary, not English, etc.). Assuming the webserver is used, a special URL may be used to return the full text of the domain (e.g., www.abc.com/--domain). Similar special URLs for other things such as crawling parameters/metadata etc. may also be used, e.g.:
www.abc.com/--info # info on crawl of abc.com
/--progress # now crawling abc.com, #589 of 1000 in batch . . . .

Each page crawled is classified and the page content is saved for ESD-index updates.

The URL Crawler differs from the domain Crawler chiefly in speed and simplicity of internal implementation of the actual crawler itself. The interfaces (command line, web, and drb) and the data storage schemes are the same, in the described embodiment. A Ruby wrapper invokes the links executable repeatedly, with a thread-safe queue ensuring that only a fixed number of downloads are running concurrently. Downloads that exceed the specified limit are killed and the slot is given to a new links process.

These crawlers differ from standard search engine crawlers in at least the following ways. An index is not built based on all the keywords, but based on categories or keyword counts per document (to update the ESD-index). So, if the only concern is keyword ESD, the entire page-content can be thrown away and only a certain number (e.g., three) of the top categories per page (instead of all keywords) need to be saved. Statistical capture/recapture methods are used to estimate the true count of categories behind a domain without necessarily always exhaustively classifying all pages behind a domain. Different priorities are dealt with (e.g., give me a result as fast as possible, or simply put it in the queue and wait until resources become available). Based on the usage-requests from the classification customers, the importance of a url is known in real-time. Based on the number of times a url is requested, it is given more priority to be crawled. This action, combined with the assumption that not all users are interested in all topics, allows the entire internet to be crawled and the long-tail can be survived in an economical way. Only the pages customers need are crawled, unlike a search engine that follows every possible page.

Speed classification can also be accomplished using the embodiments of the invention described herein. For example, in order to classify a page without looking at its content, the URL can be analyzed to determine if it has a descriptive name. When a new URL not yet seen or downloaded is obtained (and, thus, the content is not yet classified), but it is desired to send a result immediately back to the customer, a technique called speed classification is used. This technique looks only at the request URL and returns a result at once. This works by allowing the user to specify a few simple rules, as well as classifying the URL, but broken into the individual words it contains.

Using the channel builder, end users can input domains, partial matches and keywords. These inputs are then processed in the following order: if a partial match, the result is returned; if no match, domain match is tried; if domain matches, the result is returned; if domain does not match, keyword match will be returned. Keywords mean that classification algorithms are applied on these special data-structures. Alternatively, full detailed data structures can be used. This technique also allows the customer to fix the results, e.g., for the domain pets.com, always returns the channel "pets", while for others, go and do the full detail work. This approach works as well, as many websites have some structuring done by their editors.

The different embodiments of the present invention provide a number of advantages. The system can scale to hundreds of thousands of categories. The structure or ESD of the input data can be taken advantage of to come up with high-quality keywords. Keywords can be added and removed, and the weighting of keywords can be changed, on the fly. Results are easy to understand and geared to match the expectations of sales-people, simply by adding/removing keywords. The relatedness between multi-word terms, whole sentences or documents can be measured. The system and methods described herein deal with non-incremental vocabulary and does not require long pre-processing times, so that one can accomplish simple manipulations at run time. New knowledge is automatically gained and relatedness between multi-word term, non-incremental vocabulary is measured. The methods described herein take into account the given category-structure (grouping and linking of articles) and the page titles. This way, much more common-sense and domain-specific knowledge is captured through the groupings entered by human beings that write and order content (e.g., Wikipedia articles), in addition to being more sophisticated in speed and quality. A weighted inverted index is created out of the structure (e.g., grouping) and Wikipedia articles which, with some insights (like the value of short page titles), result in a fast and manageable, frequency-count based classification. The present method makes use of categories, which is more general and allows the merging of different input data sources, as long as common categories are used (e.g. merging of en.wikipedia.org and en.wikinews.org). Also, the methods described herein show how mappings and adding/removing of knowledge (e.g. adding/removing of keywords, strong bonds, etc.) can be done. The methods described herein also allow for modifications/customizations by the end user in view of the categories employed by the methods, with which humans are familiar and in view of the automatic capture of common sense and domain-specific knowledge.

Other features of certain embodiments of the present invention are as follows. Certain embodiments allow for multilingual capabilities. In particular, structured data like Wikipedia exists in many languages. By applying the same algorithms (as described herein), e.g., German, French or Spanish indexes can be built. Stop words are counted in different languages to determine the language of the text to classify. If low-level categories are being worked on and a large pool of classification results are being kept, inventory can be forecast, and inventory of new mappings can be forecast before they go into production. The methods also provide for steady, automatic quality improvements, as all downloaded content is fed back in the feedback loop. In particular, all data that is classified is used as input for ESD to further fine-tine the classification. Thus, the classification keeps getting trained with the data that is most relevant to the customers. The present invention also allows for handling of html/javascript. In particular, a page is fully rendered (including all iframes, javascript, etc.) and the rendered page is converted into text as input for classification. This provides a significant positive impact on classification results. The present invention also allows for end users to indicate word bonds (e.g., make sure two words appear in a document). It also allows for dealing with classification of pages that do not focus on a single topic. For example, the home page a newspaper typically will includes articles of many different topics. In order to manage this, for example, some rules may be established, which can be as simple as matching a list of known strings that always return "Miscellaneous" for pages that focus on multiple topics. Some embodiments of the present invention recognize the importance of the order in the url-request path—e.g., in x.com/a/b the a should be given more weight than the b. The classification system of the present invention is bettered with more input—for example, additional tags or other meta information for a page can be added to the classification input, thereby improving it. The present invention also supports cleaning rules to remove noise (e.g., delete categories that have too many hits and add little value, delete categories with numbers in the name that are too detailed, unless wanted.

It will be apparent to those skilled in the art that various modifications and variations can be made in the a system and method for school district improvement of the present invention without departing form the spirit or scope of the invention. Thus, it is intended that the present invention cover the modifications and variations of this invention provided they come within the scope of the appended claims and their equivalents.

What is claimed is:

1. A method comprising:
using a programmed computer,
   creating a data structure by identifying a plurality of words and mapping each word to one or more categories;
   storing the data structure in one or more databases;
   indexing the data structure;
   identifying an item of electronic content;
   classifying the item of electronic content using the data structure, the classifying comprising:
      identifying all single words and word combinations comprising two or more words in the item of electronic content that include one or more words;
      for each of the single words of at least a pre-determined number of characters in length and each of the words in the word combinations words of at least a pre-determined number of characters in length in each of the word combinations, identifying each of the categories to which the word is mapped;
      assigning a weight for each of the words based on an inverse proportion to the number of categories to which the word is mapped, and
      assigning a weight based on a direct proportion to a number of words in the word combination using a multiplier; and
      adding a result of classifying the electronic content to the data structure.

2. The method of claim 1 wherein the pre-determined number of characters is three.

3. The method of claim 1 wherein the programmed computer further:
   groups one or more of the categories into one or more channels.

4. The method of claim 3 wherein determining the weight further comprises assigning an additional weight based on the one or more channels associated with the one or more categories to which the word is mapped.

5. The method of claim 1 wherein the programmed computer further:
   assigns a value to the weight based on a relative relatedness between words using a semantic distance measure.

6. The method of claim 1 wherein the index is derived from existing structures configured in accordance with cognitive human notions of relatedness.

7. The method of claim 1 wherein the index is generated based on counts of categories and/or keywords in a page of electronic content.

8. The method of claim 1 wherein the item of electronic content comprises multilingual content and the classification is performed without translating the content.

9. The method of claim 1 wherein electronic content is discovered using one or more crawling engines.

10. The method of claim 1 wherein the item of electronic content comprises a web page and the classifying is performed by analyzing only a URL of the web page.

11. The method of claim 1 wherein the item of electronic content comprises a web page and wherein the classification is performed on both the web page as rendered and a language used to create the web page.

12. A system comprising:
one or more processors that are programmed to:
   create a data structure by identifying a plurality of words and mapping each word to one or more categories;
   store the data structure in one or more databases;
   index the data structure;
   identify an item of electronic content;
   classify the item of electronic content using the data structure by identifying all single words and word combinations comprising two or more words in the item of electronic content; for each of the single words of at least a pre-determined number of characters in length and each of the words in the word combinations of at least a pre-determined number of characters in length, identifying each of the categories to which the word is mapped; assigning a weight for each of the words based on an inverse proportion to the number of categories to which the word is mapped; assigning a weight based on a direct proportion to a number of words in the word combination using a multiplier; and
   adding a result of classifying the electronic content to the data structure.

13. The system of claim 12 wherein the pre-determined number of characters is three.

14. The system of claim 12 wherein the one or more processors are further programmed to group one or more of the categories into one or more channels.

15. The system of claim 14 wherein determining the weight further comprises assigning an additional weight based on the one or more channels associated with the one or more categories to which the word is mapped.

16. The system of claim 12 wherein the one or more processors are further programmed to assign a value to the weight based on a relative relatedness between words using a semantic distance measure.

17. The system of claim 12 wherein the index is derived from existing structures configured in accordance with cognitive human notions of relatedness.

18. The system of claim 12 wherein the index is generated based on counts of categories and/or keywords in a page of electronic content.

19. The system of claim 12 wherein the item of electronic content comprises multilingual content and the classification is performed without translating the content.

20. The system of claim 12 wherein one or more crawling engines are used to discover content.

21. The system of claim 12 wherein the item of electronic content comprises a web page and the classifying is performed by analyzing only a URL of the web page.

22. The system of claim 12 wherein the item of electronic content comprises a web page and wherein the classification is performed on both the web page as rendered and a language used to create the web page.

23. A non-transitory computer readable medium having stored thereon computer executable instructions that, when executed by a computer, direct the computer to perform a method comprising the steps of:
   creating a data structure by identifying a plurality of words and mapping each word to one or more categories;
   storing the data structure in one or more databases;
   indexing the data structure;
   identifying an item of electronic content;
   classifying the item of electronic content using the data structure, the classifying comprising:

identifying all single words and word combinations comprising two or more words in the item of electronic content;

for each of the single words of at least a pre-determined number of characters in length and each of the words in the word combinations of at least a pre-determined number of characters in length, identifying each of the categories to which the word is mapped;

assigning a weight for each of the words based on an inverse proportion to the number of categories to which the word is mapped; and assigning a weight based on a direct proportion to a number of words in the word combination using a multiplier; and adding a result of classifying the electronic content to the data structure.

24. The non-transitory computer readable medium of claim 23 wherein the pre-determined number of characters is three.

25. The non-transitory computer readable medium of claim 23, the method further comprising:

grouping one or more of the categories into one or more channels.

26. The non-transitory computer readable medium of claim 25 wherein determining the weight further comprises assigning an additional weight based on the one or more channels associated with the one or more categories to which the word is mapped.

27. The non-transitory computer readable medium of claim 23, the method further comprising:

assigning a value to the weight based on a relative relatedness between words using a semantic distance measure.

28. The non-transitory computer readable medium of claim 23 wherein the index is derived from existing structures configured in accordance with cognitive human notions of relatedness.

29. The non-transitory computer readable medium of claim 23 wherein the index is generated based on counts of categories and/or keywords in a page of electronic content.

30. The non-transitory computer readable medium of claim 23 wherein the item of electronic content comprises multilingual content and the classification is performed without translating the content.

31. The non-transitory computer readable medium of claim 23 wherein electronic content is discovered using one or more crawling engines.

32. The non-transitory computer readable medium of claim 23 wherein the item of electronic content comprises a web page and the classifying is performed by analyzing only a URL of the web page.

33. The non-transitory computer readable medium of claim 23 wherein the item of electronic content comprises a web page and wherein the classification is performed on both the web page as rendered and a language used to create the web page.

* * * * *

UNITED STATES PATENT AND TRADEMARK OFFICE
CERTIFICATE OF CORRECTION

PATENT NO. : 8,762,382 B2  
APPLICATION NO. : 12/462908  
DATED : June 24, 2014  
INVENTOR(S) : Harrison et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 879 days.

Signed and Sealed this  
Eighth Day of September, 2015

Michelle K. Lee  
*Director of the United States Patent and Trademark Office*